2,785,070

METHOD OF PREPARING PRE-COOKED PUFFED BROWN RICE CEREAL

Ernest B. Kester, Berkeley, and Robert E. Ferrel, Richmond, Calif., assignors to the United States of America as represented by the Secretary of Agriculture No Drawing. Application November 16, 1954, Serial No. 469,322

1 Claim. (Cl. 99—81)

(Granted under Title 35, U. S. Code (1952), sec. 266)

A non-exclusive, irrevocable, royalty-free license in the invention herein described for all governmental purposes, throughout the world, with the power to grant sublicenses for such purposes, is hereby granted to the Government of the United States of America.

This invention relates to and has as its prime object the preparation of a novel pre-cooked cereal product from brown rice. The product of this invention consists of particles of brown rice substance in a cooked, expanded, porous, dehydrated and toasted state which merely requires stirring with water or milk to prepare it for the table. The cereal dish so prepared is a valuable foodstuff containing essential vitamins and mineral salts and has a distinctive nutty flavor not found in the prior-art precooked cereals. Further objects and advantages of the invention will be obvious from the description herein.

The preparation of the novel cereal product is described as follows:

The starting material is brown rice. This product, as well known in the industry, is made by removing the hulls from rough (paddy) rice and consists of the rice endosperm, the germ, and the bran and aleurone layers. The name brown rice is derived from the fact that the bran layers are usually brown although in many cases the grain may have a yellowish or greenish color. Brown rice is a more valuable foodstuff than white rice because of its greater content of vitamins and other important diet factors. Thus since brown rice retains the bran layers and germ, it contains vitamins of the B group, especially thiamin, riboflavin, and niacin, vitamin E, and noteworthy amounts of nutritionally valuable mineral compounds of iron, phosphorus and calcium.

In the first step of the process raw brown rice is soaked in water to hydrate the grains. The soaking may be accomplished at room temperature or at higher temperatures to accelerate imbibition of moisture by the grains. In general temperatures from about 20° C. to about 100° C. may be used. The soaking is continued until the grains increase their moisture content to a level of about 25% to about 35%. A simple method of performing the soaking involves placing the brown rice in a vessel, covering it with water at about 90° C., and holding this temperature for about 20 minutes. After soaking, the grains are preferably washed with cold water to remove starch particles, debris, etc., and thoroughly drained.

The soaked grains are then cooked so that the final product will be in a precooked condition whereby its preparation for the table will require only rehydration of the rice material, not additional cooking. The cooking of the soaked brown rice may be accomplished by boiling in water or by direct contact with steam. The latter technique is preferred as complete gelatinization of the starch content may be attained with a lessened tendency of the grains to clump together and further, there is a decreased sloughing off of valuable nutrients from the rice when the cooking is done with steam. Steam treatment at superatmospheric pressure is preferred to expedite the process. For example, treatment at 15 lbs. per sq. in. gauge pressure will accomplish complete cooking in about 15 minutes. With any technique applied, the cooking should be continued to the point that the rice grains are soft but still remain separate; the material should not be overcooked to the point of getting a mushy material or one in which the grains cohere to one another.

The cooked rice grains are then subjected to drying, without altering the shape of the grains thereof, at a relatively low temperature, i. e., about from 35 to 100° C. This operation may be carried out in a tray drier but preferably a rotary drier or air suspension drier is used to keep the grains agitated thus to break up clumps and/or prevent their formation during the process. In such rotary or air suspension drier, the grains are agitated while subjected to a current of air heated to about 35 to 100° C., preferably about 40° C. Preferably the drying is conducted in stages, allowing the partially dried material to stand between drying stages so that the moisture content can become uniform throughout the mass of grains. The drying operation is continued until the moisture content of the rice is about 8 to 14%. The degree of moisture has an effect on the subsequent toasting-puffing operation, thus the lower the moisture content within the above range, the greater will be the degree of expansion during the toasting-puffing operation. Rice grains dried to about 10% moisture content when subjected to the toasting-puffing operation will give a product having a volume of about 4 times that of the original brown rice and will have a porous texture whereby re-absorption of water into the final product takes place at a very rapid rate.

The toasting-puffing step, mentioned briefly above, involves subjecting the partially dried rice of 8–14% moisture content to a stream of air, maintained at about 250–300° C. This treatment serves two primary purposes. In the first place, application of the hot air to the partially dried grains causes a rapid expulsion of steam whereby the grains expand or puff. The dense grains having about the same volume as the original brown rice are converted into porous grains having a volume of 2 to 4 times that of the original brown rice. Cross-sectioning of the puffed grains shows that the enlargement is caused by the formation of a multitude of bubbles throughout the grains forming a porous sponge-like mass. The second end achieved in this operation is that a nutty flavor is developed in the product. Thus the toasting-puffing operation converts the essentially bland-tasting products into a product which has a definite nutty flavor. The hot air causes a toasting of the grain surfaces whereby they develop a tan to brown color and certain chemical changes take place so that the rice material develops a distinctive taste entirely different from that of conventional rice products.

The toasting-puffing operation is preferably conducted in such manner that the grains are suspended and tumbled about in a hot air stream. Thus for example the partially dried cooked brown rice is placed in a vessel provided with a duct connecting with the bottom of the vessel. Air at about 250–300° C. is introduced into the duct and blown up through the vessel at such velocity that the grain are suspended and tumbled about by the air stream. In this manner a maximum contact between the rice and hot air is attained and the maximum degree of puffing is obtained. The treatment is continued until the grains puff to about 2 to 4 times normal volume and until they develop a tan to golden brown color, the color being indicative of the development of the desired nutty flavor. At this point the grains have a volume of about 2 to 4 times the volume of the original brown rice, they have a tan to golden brown color, and in texture they are porous and crisp, the interior of the grains being composed of a multitude of small spheroidal voids uniformly dispersed throughout the rice substances.

To put the product into the best form for use as a breakfast cereal it is ground to the fineness of a meal—about 20 to 60 mesh. To prepare the cereal for the table the ground product is mixed with about 3 times its volume of warm water or milk. It will be observed that upon stirring for a few minutes the liquid is completely absorbed and there is formed a dish having the approximate consistency of cooked farina but possessing a unique nut-like flavor.

If desired, the flavor of the rice cereal of this invention may be varied by the incorporation of such ingredients as malt syrup, sweetening agents, salt, and the like into the product before, during, or after processing.

Having thus described the invention, what is claimed is:

A process of preparing a pre-cooked cereal which comprises soaking brown rice in water, cooking the soaked rice, drying the cooked rice, without altering the shape of the grains thereof, to a moisture content about from 8 to 14%, at a temperature about from 35 to 100° C., subjecting the dried brown rice to the action of a current of air at about 250–300° C. of sufficient velocity to suspend the rice grains and tumble them about, this treatment being continued until the grains have puffed to about 2 to 4 times their normal volume and until the grains have developed a tan to golden brown color and a nutty flavor.

References Cited in the file of this patent

UNITED STATES PATENTS

| | | |
|---|---|---|
| 1,239,555 | Baumgartner | Sept. 11, 1917 |
| 1,399,920 | Baumgartner | Dec. 13, 1921 |
| 1,925,267 | McKay | Sept. 5, 1933 |
| 2,438,939 | Ozai-Durrani | Apr. 6, 1948 |
| 2,610,124 | Roberts | Sept. 9, 1952 |